United States Patent

[11] 3,628,275

[72] Inventor Charlie C. Howard
 Rural Route, Hudson, Ill. 61748
[21] Appl. No. 869,040
[22] Filed Oct. 24, 1969
[45] Patented Dec. 21, 1971

[54] FISHING ROD HOLDER WITH BITE SIGNAL
 2 Claims, 4 Drawing Figs.
[52] U.S. Cl. ................................................... 43/17
[51] Int. Cl. ............................................. A01k 97/12
[50] Field of Search .......................................... 43/17

[56] References Cited
 UNITED STATES PATENTS
3,010,239 11/1961 Johnson ........................ 43/17
3,156,997 11/1964 Smith ............................ 43/17
3,359,672 12/1967 Schwartz et al. ............... 43/17

Primary Examiner—Samuel Koren
Assistant Examiner—Daniel J. Leach
Attorneys—Clarence A. O'Brien and Harvey B. Jacobson ABSTRACT: A cuplike socket member is pivotally and tiltably bracketed on a ground penetrating and anchoring standard. This standard provides an upstanding portable stake and is provided on a median side portion with a flashlight which provides a pull-responsive bite signal. The handle is a fishing rod is removably inserted in the socket. When the fish takes the hook, the rod tilts the socket member whose bottom portion presses a spring-returned pushbutton switch to operate the visual signal. Spring-biased plunger means is mounted atop the standard and assists in maintaining the socket member in a balanced ready-to-function position.

PATENTED DEC 21 1971 3,628,275

Charlie C. Howard
INVENTOR

BY Clarence A. O'Brien
and Harvey B. Jacobson
Attorneys

FISHING ROD HOLDER WITH BITE SIGNAL

This invention relates to a portable self-contained fishing rod holder and bite and rod responsive signal, more particularly, a stake-type standard which is anchored in the ground and is equipped with coordinating facilities which have been combined to achieve the improved end result desired by the user.

Briefly, the invention is characterized by a portable support or stand embodying a standard or upright, more explicitly, a simple flat-faced bar of requisite length which has a pointed end which is forcibly staked in the ground. The upper end of the standard can be provided, if desired, with a crosshead to assist in pressing and anchoring the pointed lower end of the bar in a seemingly evident manner. A U-shaped bracket has a bight portion fixed to a median part of the standard with outstanding arms projecting outwardly therefrom. This bracket serves to accommodate an elongated normally vertical but tiltable cuplike socket member. This member can be cylindrical in cross section and it has a median portion which is pivoted and cradled for limited tilting movement between the arms of the U-bracket. The socket member is closed at its bottom and open at the top. It normally assumes a spaced substantially parallel position alongside the upper part of the standard. The receptacle or socket portion serves to insertably receive and retain the handgrip of a conventional fishing rod. A fixture is provided on one side on which a suitable battery-operated flashlight is mounted. The flashlight has an off-and-on switch. For purposes of bringing the flashlight into play, a spring-loaded pushbutton switch is adjustably mounted on the standard and is wired to the flashlight. The button is so located that when the socket member is rocked and tilted it exerts pressure on the button and closes the switch and actuates the bite signalling light. It is within the purview of the invention to provide an adjustable spring-biased plunger on the upper end portion of the standard said plunger having a head which rests against the upper open end portion of the socket member. The spring is adjustably tensioned so as to assist in holding the socket member in a substantially vertical ready-to-function sensitively operable state.

By using a flat-faced bar as the standard or stake it lends itself to practical use of the U-shaped bracket on one side for cradling the socket member and a bent strap-type fixture on the opposite side which positions and supports the battery-equipped bite-signalling light. The flat construction also serves to accommodate a collar on the pressure-responsive switch buttton which can be adjusted and held by a setscrew. Then too, the upper end portion lends itself to adaptable use of the spring-loaded plunger whose head contacts the open upper end portion of the socket member to assure proper alignment and responsive functioning of the socket member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
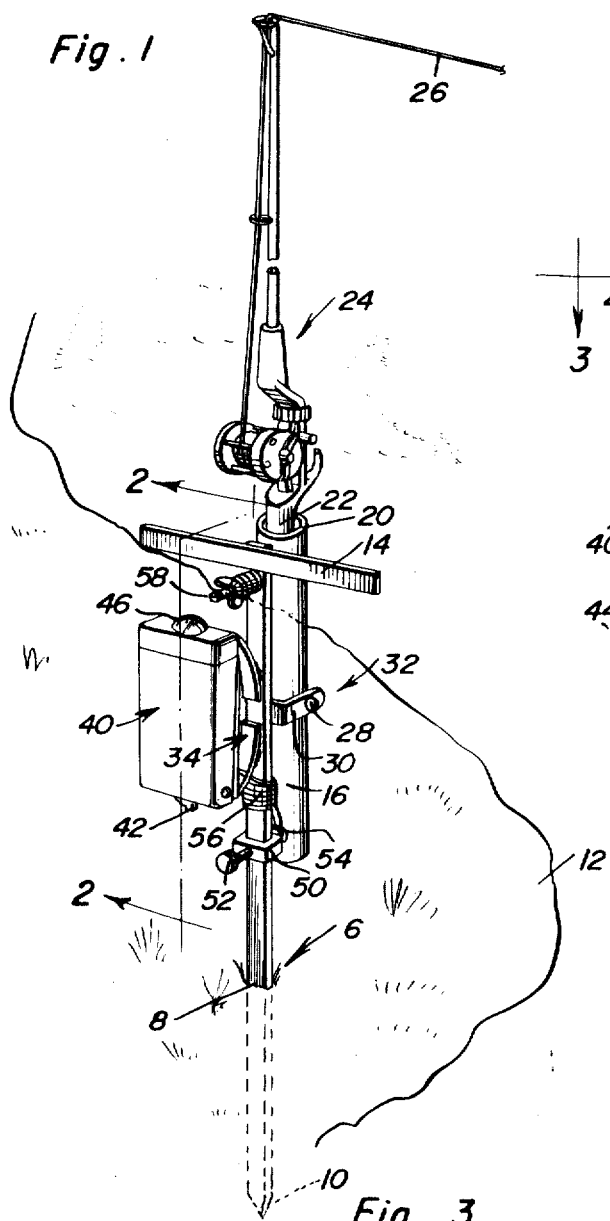
FIG. 1 is a view in perspective of a fishing rod holder including the illuminable pull-responsive bite signal and showing the same set with the handgrip of the fishing rod readied for use.

The portable stand is preferably but not necessarily T-shaped in general appearance and is denoted by the numeral 6. The part which is referred to as the standard or stake is denoted by the numeral 8 and comprises a rigid flat-faced bar or strip member whose lower end 10 is pointed and adapted to penetrate the ground 12. This bar member is of requisite cross-sectional dimension and is provided preferably at the top with a centrally attached crosshead 14 which provides handle means and facilitates pressing and sinking the pointed end of the standard in the ground in a self-evident manner.

The holder proper comprises a vertically elongated cuplike socket member. This socket member 16 may be and preferably is cylindrical in cross section and has a closed bottom 18. The upper end 20 is open for convenient reception and temporary retention of the handgrip 22 of a conventional attachable and detachable fishing rod 24. The fishing line is denoted at 26. When the fishing line is pulled by the fish, the rod 24 is tilted and in turn actuates the tiltable socket member or holder. For best results, the median portion of the socket member is pivotally cradled at 28 between the side arms 30 of the U-shaped bracket 32. The bight portion 33 is attached to one side of the standard 8. A complemental fixture is provided on the opposite side as denoted at 34. The fixture comprises a strap member 36 which is attached to at 38 to a surface of a rectangular-type battery-operated flashlight 40. This flashlight is suitably mounted and is provided with an off-on trip switch 42, with a battery 44 and bite-signalling light which is denoted generally stated at 46. The turned-in end portions 48 of the strap 36 are welded or otherwise secured to the standard 8 opposite the bight portion 33 of the bracket 32.

Figure 2:
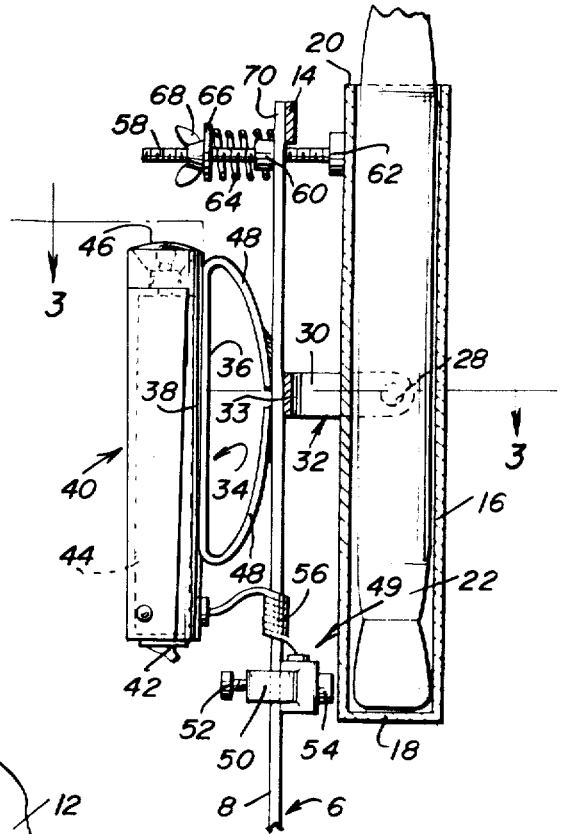
FIG. 2 is an enlarged fragmentary view with parts in section and elevation showing the construction and arrangement of the coacting component parts.

The tilt-responsive pushbutton switch 49 has a collar 50 which is slidably mounted on the standard and is held in a suitably adjusted position by a setscrew 52. The spring-loaded pushbutton 54 is situated in a position for cooperation with the lower closed end portion of the socket member so that when said portion swings from right to left (FIG. 2) the button 54 is depressed and the circuit is closed. This switch means is provided with suitably wrapped wiring 56 which is connected thereto and also to the flashlight to actuate the flashlight when the contest button 54 is depressed.

Figure 3:
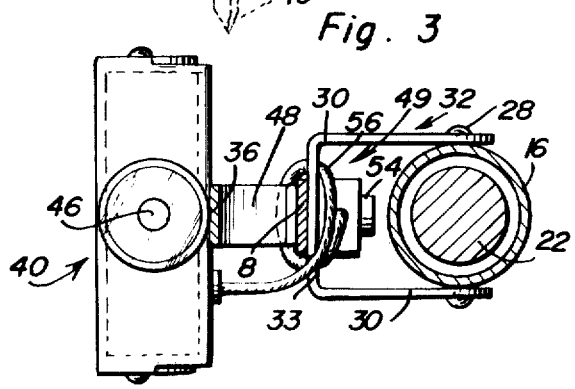
FIG. 3 is a view also with parts in section and elevation taken approximately on the plane of the irregular section line 3—3 of FIG. 2.
Figure 4:
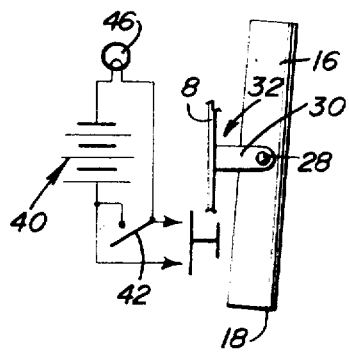
FIG. 4 is a diagrammatic view which should prove helpful in understanding the subject matter of the invention.

It has been found desirable to provide simple mechanical manually regulable means on the upper end of the standard to assist in maintaining the socket member in a substantially vertical ready-to-function position. The means preferred comprises a simple plunger, more particularly a screw-threaded rod 58 slidingly operable through a guide collar 60 and provided with a head 62 which is secured to the upper open end portion of the socket member 16. A coil spring 64 or requisite tension is provided and encircles the medial portion of the rod and rests against the standard 8 at one end and against a washer 66 AT the opposite end, said washer being adjusted by a thumb nut 68 mounted on the screw threaded rod. This spring-biased plunger means serves in the manner illustrated in FIG. 2 to assist in readying the socket 16 for tilting, that is, when the fishing line 26 is yanked by the fish. This plunger means is located on the upper end 70 of the standard 8 just below the handle-forming crosshead 14. The manner in which the fishing rod holder is set up for use is clear from FIG. 1. It is also clear from this view and also from FIGS. 2 and 3 that when the fish takes the hook and exerts a pull on the line the fishing rod is tilted so as to tilt the socket member. The socket member, when rocked and tilted, presses the button 54 which closes the circuit and actuates the bite-signalling light means 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bite-signalling holder for a readily applicable and removable fishing rod comprising a vertically elongated bar of predetermined length and cross section having upper and lower ends, said lower end being pointed, said bar providing a standard, said upper end having a crosshead fastened intermediate its ends to the bar and providing outstanding handles, a U-shaped bracket having a bight portion fixed to a median portion of one side of said standard, said bracket providing a pair of outstanding arms, a vertically elongated cuplike socket member having median portion pivoted and cradled for limited tilting movement between said arms, said socket member having a closed bottom and being open at its top for insertable reception and retention of the handgrip of the fishing rod, a mounting and spacing fixture comprising a strap member bent upon itself between its ends and having end portions affixed to a side of the standard adjacent to and opposite the bight portion of said U-shaped bracket, a switch-equipped flashlight mounted for operation on a component median part of said strap member, and a pushbutton bite-responsive switch also mounted on said standard and having an operating button interposed between one side of the closed bottom portion of the socket member and said standard, and wiring means electrically connecting said pushbutton switch with the bite-signalling flashlight, said pushbutton switch having a mounting collar surrounding and shiftably adjustably mounted on said standard, said collar having a readily accessible setscrew which is retentively engageable with said standard.

2. The holder defined in and according to claim 1, and a spring-equipped plunger slidingly and adjustably mounted on an upper end portion of the standard at a level above the locale of said flashlight and below said crosshead, said plunger being disposed horizontally and at right angles to the vertical axis of the standard and having a head abutting and secured to a side surface of a coacting upper end of said socket member.

* * * * *